United States Patent Office 3,039,558
Patented June 19, 1962

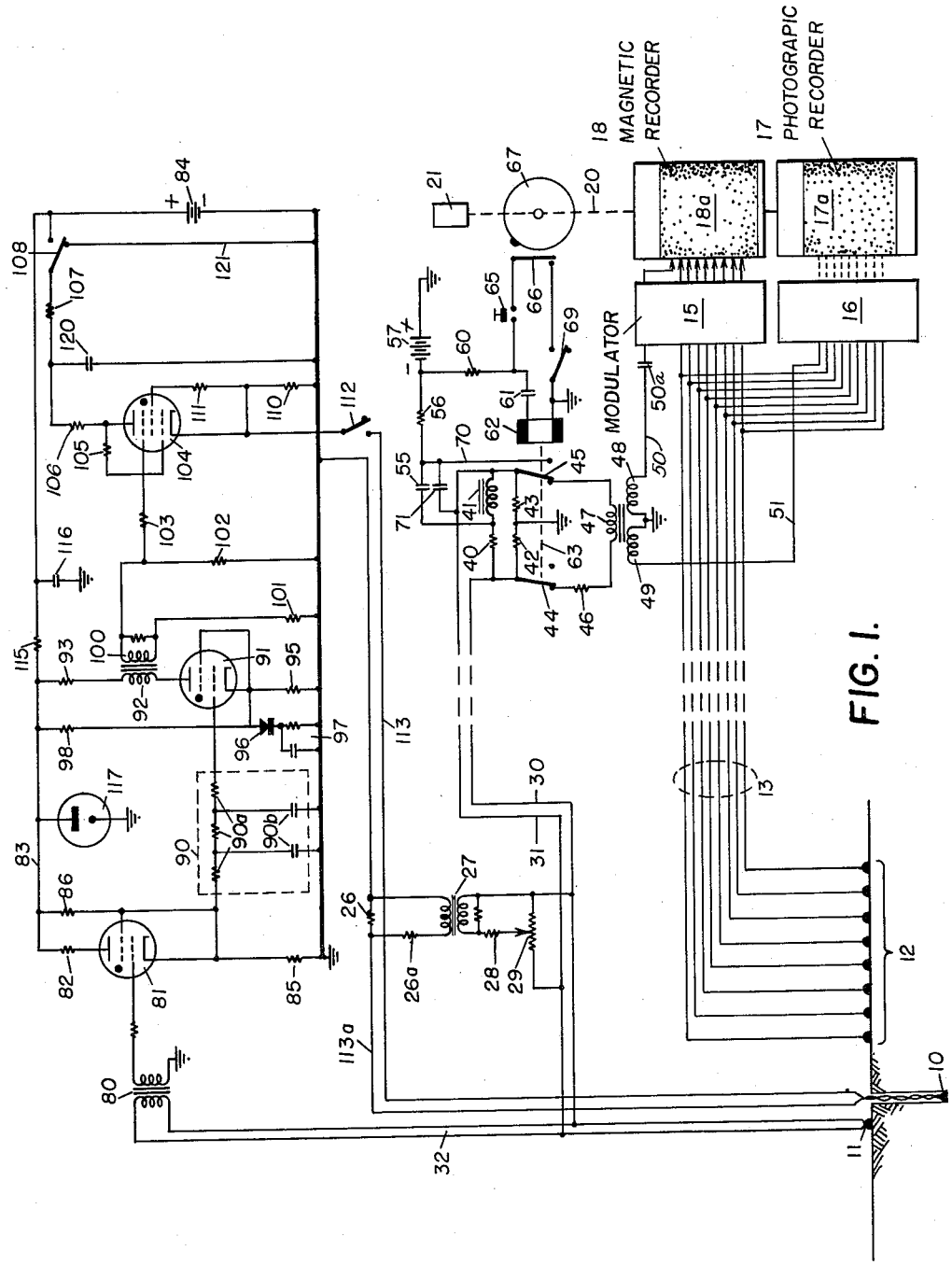

3,039,558
DELAYED INITIATION OF SEISMIC WAVE
GENERATION
Francis M. Romberg, Irving, Tex., assignor, by mesne assignments, to Socony Mobil Oil Company, Inc., New York, N.Y., a corporation of New York
Filed June 24, 1957, Ser. No. 667,471
10 Claims. (Cl. 181—.5)

This invention relates to the generation of seismic waves and more particularly to a system for detonation of an explosive charge in synchronism with the rotation of a cyclically-driven, record-receiving system.

In recording seismic signals on photographic film on a magnetic medium it has been found advantageous to employ a record-receiving medium which is mounted on a drum and rotated cyclically past a recording point. In utilizing such a recording system it is desirable to initiate the generation of the seismic waves in synchronism with movement of the recording medium so that the position of the recorded signals on the recording medium may be controlled. It is further desirable that a relatively simple signal channel be maintained between the recording station and the generating station.

In accordance with the present invention there is provided a signal channel extending between a recorder and a seismic generating station. A first means is provided for producing a control pulse in response to a predetermined condition in the recorder. A circuit responsive to the control pulse and including a delay means is provided for producing in the signal channel a seismic signal initiating pulse. A detector responsive to seismic signals in the region of said generating station is connected to the signal channel. Means are provided at the recorder for connecting the signal channel to the recorder prior to generation of the initiating pulse for recording the initiating pulse and the output of the detector without interference from the control pulse.

For a more complete understanding of the present invention and for further objects and advantages thereof, reference may now be had to the following description taken in conjunction with the accompanying drawings in which:

FIG. 1 is a schematic diagram partially in block form of the present invention.

Referring to the drawing, an explosive charge 10 provided with a suitable detonator is loaded in a shot hole. Upon detonation of charge 10, seismic waves are produced which travel uphole to a surface detector 11 and to a plurality of detectors in a spread 12. Detectors in spread 12 are connected by cable 13 to a modulator 15 and to the input unit 16 of a photographic recorder 17. Multichannel modulator 15 is connected at its output to a magnetic recorder 18. Recorders 17 and 18 comprise rotatable drums each carrying recording-receiving mediums 17a and 18a, respectively, on which the signals from detectors in spread 12 may be recorded. The recording mediums 17a and 18a and their carrier drums are mounted on a common drive means such as a shaft represented by the dotted line 20 which may be coupled to a suitable drive motor 21.

With motor 21 energized, the elements 17a and 18a may then be rotated as to receive signals from modulator 15 and input unit 16 to provide a time-amplitude representation of signals on cable 13 and on channels 50 and 51. The remainder of the system included in the drawing is provided for detonating charge 10 with the recording elements of recorders 17 and 18 in a predetermined position relative to the recording charts 17a and 18a. At the same time provision is made for actuation of the circuit between the recording station and the detonating station to establish dependable communication for bi-directional transmission of control information.

More particularly, current in a channel including resistor 26 is utilized to initiate detonation of charge 10. Such current, in the form of a sharp pulse passing through a resistor 26, causes a voltage drop which is applied by way of resistor 26a to a transformer 27. The output of transformer 27 is connected by way of resistance 28 and potentiometer 29 to a communication channel including conductors 30 and 31.

A signal produced by detector 11 representative of seismic waves traveling directly upward from explosive charge 10 is applied by way of channel 32 to conductors 31 and 30. Conductors 30 and 31 extend from the generating station or shot point to the recording station.

At the recording station a first circuit is connected across conductors 30 and 31 and comprises a resistor 40 and an inductance 41. A second circuit is connected across conductors 30 and 31 and comprises resistances 42 and 43 which are connected in series with the juncture therebetween connected to ground. Conductors 30 and 31 terminate at switch armatures 44 and 45. Armatures 44 and 45 are normally biased in the position illustrated so that a third circuit normally is connected across conductors 30 and 31 and comprises resistor 46 connected in series with a transformer primary winding 47. The secondary windings 48 and 49 are connected in series with the center tap thereof grounded. Winding 48 is then connected by way of coupling condenser 50a to one input of modulator 15. The secondary winding 49 is connected by channel or conductor 51 to an input of the unit 16.

The juncture between resistance 40 and inductance 41 is connected to a condenser 55 and thence by way of resistor 56 to one terminal of a battery or other voltage source 57. The second terminal of source 57 is connected to ground. The juncture between resistance 56 and battery 57 is connected by way of resistor 60 and condenser 61 to a coil 62 which actuates armatures 44 and 45 by means of a linkage represented by the dotted line 63. The circuit comprising condenser 61 and coil 62 is connected in parallel with a second circuit which includes a push button switch 65, a switch 66 which is actuated by a cam 67 mounted on shaft 20, and a master switch 69. The right hand contact associated with armature 45 is connected by conductor 70 to the juncture between condenser 55 and resistor 56 and by way of condenser 71 to conductor 31.

Uphole signal channel 32 is connected both to the uphole detector 11 and to conductors 30 and 31 and is terminated in an input transformer 80. The output winding of the transformer 80 is connected to the control grid of a gas discharge tube 81. The anode of tube 81 is connected by way of an anode resistor 82 to a conductor 83 which in turn is coupled to a source of positive voltage such as the terminal of a battery 84.

The cathode of tube 81 is connected by way of resistor 85 to ground. The second electrode of tube 81 is connected to the cathode thereof and also, by way of resistor 86, to the B+ bus 83. The cathode of tube 81 is connected by way of a time delay network 90 to the control electrode of a second gas discharge tube 91.

The anode of tube 91 is connected by way of a transformer primary winding 92 and anode resistor 93 to the B+ bus 83. The cathode and the second control electrode of tube 91 are connected by way of resistor 95 to ground, by way of rectifier 96 and RC circuit 97 to ground and by way of a resistor 98 to the B+ bus 83. Secondary winding 100 is connected by way of resistances 101 and 102 to ground. The juncture between winding 100 and resistor 102 is connected by way of resistor 103 to the third electrode of a gas discharge tube 104.

The anode of tube 104 is connected by way of resistor 105 to the first control electrode and by way of resistor 107 to the armature of a switch 108. The upper contact of switch 108 is connected to the positive terminal of battery 84. The cathode of tube 104 is connected by way of resistance 110 to ground and by way of resistance 111 to the second control electrode. The cathode may also be connected through switch 112 to a conductor 113 which leads directly to the detonator in charge 10. Conductor 113a completes a circuit from the detonator through resistance 26 to ground.

The juncture between resistance 107 and the anode of tube 104 is connected by way of condenser 120 to ground. Additionally, the negative terminal of source 84 is connected to ground.

The conductor leading from the positive terminal of battery 84 to the B+ bus 83 includes a resistor 115. The juncture between the battery 84 and resistor 115 is connected to ground through a condenser 116. The bus 83 is connected to ground through a voltage regulator tube 117. By this means the conductor 83 is maintained at a controlled or regulated potential with reference to ground in order to assure the desired operation of tubes 81 and 91.

The system above described functions in the following manner to permit an operator at the recording station operating the magnetic recorder 18 and/or photographic recorder 17 to determine or fix the instant at which charge 10 will be detonated. Basically, there is provided time sharing on the communications channel 30, 31.

Preparatory to detonating charge 10, condenser 55 is charged from the source 57 and master switch 69 is closed. Upon indication from the operator at the recording station, personnel at the other end of the channel 30, 31 will close switches 108 and 112. When this is done, condenser 120 will charge at a relatively low rate through resistor 107. Motor 21 is then energized to rotate the recording medium in recorders 17 and 18 and to rotate a cam 67. On each revolution of cam 67 switch 66 is closed. Thus the system is energized to receive seismic signals for recording by way of cable 13 in conjunction with the recording of time break signals transmitted by way of channel 30, 31 which ultimately leads to transformer secondary windings 48 and 49.

The operator may then close the push button switch 65 so that upon the succeeding revolution of cam 67 the closure of switch 66 will cause a short circuit to appear across the circuit comprising condenser 61 and coil 62. As condenser 61 discharges through coil 62, armatures 44 and 45 are moved to the right hand position so that the circuit comprising condenser 55 and inductance 41 is maintained closed by armature 45 for a period of about 14 milliseconds (in one embodiment of the invention). The discharge of condenser 55 through the inductance 41 produces on the communication channel 30, 31 a sharp pulse which is then transmitted to the channel 32 and thence to transformer 80. The latter pulse is then applied to the grid of tube 81 to initiate conduction therein.

It is to be noted that the cathode of tube 81 is maintained at a positive potential relative to the control grid by the voltage division provided in the circuit comprising resistors 85 and 86 which is connected between ground and B+ bus 83. When the pulse from transformer 80 drives the control grid sufficiently positive, tube 81 will begin to conduct. The resultant change in cathode voltage is then applied to the time delay network 90. The combination of resistors 90a and condensers 90b delays the transmission of the pulse at the cathode of tube 81 to the control grid of the tube 91. The delay interval preferably is greater than the operating cycle of relay 62, 44—45. In the embodiment where the latter cycle was 14 milliseconds, network 90a—90b produced a delay of about 20 milliseconds.

The cathode of tube 91 is maintained positive relative to its control grid by the voltage division produced by the series circuit including resistors 95 and 98. When the control grid of tube 91 is driven sufficiently positive by the output voltage from the delay circuit 90, conduction is initiated in tube 91 applying a sharp, high amplitude pulse to transformer windings 92 which is coupled to transformer winding 100. The voltage produced in winding 100 is then applied to the third control electrode of the gas discharge tube 104. When conduction is initiated in tube 104, condenser 120 discharges through the circuit including resistor 106, tube 104, switch 112, conductor 113, the detonator in charge 10, conductor 113a, resistor 26, and thence to ground. The discharge of condenser 120 through the charge detonator initiates the generation of seismic waves In the interval required for transmission of the pulse through the time delay network 90 armatures 44 and 45 return to their normal position, completing a circuit from channel 30, 31 to transformer primary winding 47. The time break signal produced by flow of detonating current from condenser 120 through the resistance 26 is thus transmitted to the recorders 17 and 18. The time break signal is then followed immediately by the appearance of the uphole signal from detector 11 which also is transmitted by way of conductors 30 and 31 to recorders 17 and 18.

The use of drum type recorders permits the use of a relatively small motor 21 and consequently lower instantaneous power in order to bring the recording medium up to the desired speed relative to a recording point. By utilizing the present system, motor 21 may be energized to bring the recording systems and the cam 67 to a predetermined speed gradually. The cam 67 when properly positioned relative to a desired initial point on the recording mediums 17a and 18a will close switch 66 such that the delay occasioned between closure of switch 66 and the detonation of charge 10 will be predetermined, corresponding with the travel of the recording medium past a recording point a predetermined distance.

Ordinarily recording mediums 17a and 18a will be spliced onto a drum or will otherwise be overlapped. By the present invention the time break signal may be recorded in predetermined relation to the position on a recording drum of any such discontinuity in the recording medium. Positive recording of the shot instant and the uphole signal is assured as in conventional seismic systems while an operator at the recording station maintains primary control of all operations. At the same time a maximum of safety is provided by leaving to the discretion of personnel at the shot point the closure of switches 108 and 112. Unless both switches 108 and 112 are properly set, charge 10 will not be detonated. As a precautionary measure, the second terminal of switch 108 is connected to ground as by way of conductor 121. By this means condenser 120 normally will be discharged to prevent inadvertent detonation of charge 10.

From the foregoing it will be seen that a time break circuit leading to a recording means is momentarily opened for production of a control signal at the recording station and the transmission of such control signal to a shot location. At the shot location the control signal is delayed in transit to a detonator during which delay the time break circuit is again reestablished preparatory to receiving the initial signals from charge 10 and uphole detector 11 and for recording such signals at a predetermined position on a recording medium. The entire system is operated with the use of relatively low peak current demands by providing relatively long charging periods for condensers 55, 61 and 120 and by utilization of such energy by the abrupt discharge of each of the latter elements for sequential energization of coil 62, discharge of condenser 55 and discharge of condenser 120.

It will now be recognized that various embodiments of the invention may be employed in view of the foregoing description. One specific embodiment of the invention employed the following parameters.

| | |
|---|---|
| Resistor 26 | 1 ohm. |
| Resistor 26a | 10 ohms. |
| Resistor 85 | 25,000 ohms. |
| Resistor 86 | 200,000 ohms. |
| Resistor 90a | .1, .5 and 1.0 megohm. |
| Resistance 95 | 33,000 ohms. |
| Resistor 98 | 100,000 ohms. |
| Resistor 107 | 51,000 ohms. |
| Resistor 115 | 3,900 ohms. |
| Condenser 55 | 1 microfarad. |
| Condensers 90b | .1 and .03 microfarad. |
| Condenser 116 | 1 microfarad. |
| Condenser 120 | 12 microfarads. |
| Inductance 41 | 6 millihenries. |
| Battery 84 | 100 volts. |
| Tube 117 | OB2. |
| Transformers 92, 100 | I-1027B. |
| Relay 62, 44—45 | GE-3S2791-G200-A-6. |

While the invention has been described in connection with certain specific embodiments thereof, it will now be understood that further modifications will suggest themselves to those skilled in the art and it is intended to cover such modifications as fall within the scope of the appended claims.

What is claimed is:

1. In a seismic exploring system wherein an explosive charge detonated at a generating station produces seismic waves to be detected and applied to a rceorder at a recording station the combination which comprises a signal channel extending between said generating station and said recording station, a detonator for said explosive charge, two circuits interconnecting said signal channel and said detonator at said generating station, the first of said circuits including a circuit means responsive to first signals in said signal channel for applying to said detonator a detonating impulse a predetermined time interval following the appearance of said first signals in said channel, the second of said circuits including circuit means at said generating station for transmitting signals representative of said impulse by way of said signal channel to said recording station, means for connecting said recorder to said signal channel, and control means at said recording station responsive to a predetermined condition of the recorder for rendering said recorder non-responsive to any signals in said signal channel for a period less than said time interval and for simultaneously applying said first signals to said signal channel.

2. In a seismic exploring system wherein an explosive charge detonated at a generating station produces seismic waves to be detected and applied to a recorder at a recording station the combination which comprises a signal channel extending between said recorder and said generating station, means coupled to said recorder for producing a control pulse at said recorder in response to a predetermined condition therein, delay means at said generating station connected to said signal channel rsepensive to said control pulse for producing an initiating pulse, circuit means interconnecting said delay means and said explosive charge for applying said initiating pulse to said explosive charge, detecting means responsive to seismic signals at said generating station and connected to said signal channel, and means at said recorder and in said system for connecting the signal channel to the recorder intermediate the generation of said control pulse and said initiating pulse for recording said initiating pulse and the output of said detecting means without interference from said control pulse.

3. In a seismic exploring system wherein an explosive charge detonated at a generating station produces seismic waves for detection and recording, the combination which comprises a recorder, a signal channel terminated at a first extremity at said generating station and at a second extremity at said recorder, means coupled to said recorder for producing a control pulse at said recorder in response to a predetermined condition therein, means for momentarily completing a first circuit between said recorder and said second extremity for applying said control pulse to said signal channel, delay means connected to said first extremity of said signal channel and responsive to said control pulse for producing an initiating pulse adapted to detonate said explosive charge, circuit means interconnecting said delay means and said signal channel for applying said initiating pulse thereto, a signal input circuit at said recorder, and means for connecting said signal input circuit to said signal channel at said second extremity intermediate the instants of generation of said control pulse and said initiating pulse for recording the time occurrence of said initiating pulse without interference from said control pulse.

4. In a seismic exploration system the combination comprising a recorder adapted to record seismic signals and including a cyclically-driven, record-receiving element, a circuit extending from said recorder to a seismic generating station, means controlled by said element for generating and applying a pulse to said circuit at a predetermined position of said element, a seismic source at said generating station, initiating means for said source and coupled thereto, a first channel interconnecting said circuit and said initiating means including a delay means for transmitting said pulse to said source a predetermined time after generation of said pulse, a second channel interconnecting said circuit and said initiating means for applying said pulse to said circuit coincident with the application thereof to said source, and means in said system for connecting said recorder to said circuit in the interval intermediate the generation of said pulse and the application thereof to said source for recording said pulse after passage through said delay means.

5. In a seismic exploration system the combination comprising a recorder having a discontinuous, cyclically-driven, record-receiving element, means for initiating generation of seismic waves at a shot point, a first circuit interconnecting said recorder and the means for initiating seismic waves, means coupled to said element and operative at a predetermined rotational position of said element to interrupt said circuit at said recorder and for generating and applying to said circuit an initiating pulse, delay means in said circuit and at said shot point for delaying said initiating pulse for a predetermined interval, a second circuit connected in an output side of said delay means for applying the delayed initiating pulse to said first circuit, and means in said system for closing said first circuit at said recorder during said interval.

6. In a seismic exploring system wherein an explosive charge detonated at a generating station produces seismic waves to be detected and applied to a recorder at a recording station, the combination which comprises a signal channel extending between said generating station and said recording station, a detonator for said explosive charge, a delay circuit interconnecting said signal channel and said detonator including circuit means responsive to signals in said signal channel for applying a detonating impulse a predetermined time interval following the appearance of said signals, a circuit interconnecting the output of said delay circuit and said signal channel for applying a timing pulse to said signal channel in predetermined time relation with said detonating impulse, a circuit including a switch for connecting said signal channel to said recorder, and means operative in response to a predetermined condition of said recorder for opening said switch to disconnect said recorder from said signal channel and for simultaneously generating and applying said signals to said signal channel, said last name means being operative to close said switch to reconnect said signal channel to said recorder prior to the expiration of said time interval.

7. In a seismic exploring system wherein an explosive charge is to be detonated at a generating station to produce seismic waves for detection and application to a recorder at a recording station, the combination which comprises a signal channel extending between said generating station and said recording station, a capacitor for storing an electrical charge, an inductance connected to said channel and to said capacitor, circuit means including a relay armature connected to said inductance and adapted normally to connect said signal channel to said recorder, means operative in response to a predetermined condition in said recorder for actuating said armature to disconnect said signal channel from said recorder for a predetermined interval and to discharge said capacitor through said inductance to generate a signal to said signal channel, a detonator circuit at said generating station, a delay circuit interconnecting said signal channel and said detonator circuit for applying a detonating impulse to said detonator circuit after a time delay following discharge of said capacitor which is greater than said predetermined interval.

8. In a seismic exploring system wherein an explosive charge detonated at a generating station produces seismic waves to be detected and applied to a recorder at a recording station the combination which comprises a signal channel extending between said generating station and said recording station, a first capacitor for storing an electrical charge, an inductance connected to said channel and to said first capacitor, circuit means including a relay armature connected to said inductance and adapted normally to connect said signal channel to said recorder, means operative in responsive to a predetermined condition in said recorder for actuating said armature to disconnect said signal channel from said recorder for a predetermined interval and to discharge said first capacitor through said inductance to generate a signal to said signal channel, a detonating circuit at said generating station, a second capacitor for storing an electrical charge, a delay circuit connected to said signal channel and responsive to said signal for discharging said second capacitor through said detonating circuit after a delay following discharge of said first capacitor which is greater than said predetermined interval.

9. The combination of claim 8 in which a cross circuit extends between said detonating circuit and said signal channel to develop a signal in said signal channel coincident with discharge of said second capacitor.

10. In a seismic exploration system the combination which comprises a recorder having a discontinuous, cyclically-driven, record-receiving element, means for initiating generation of seismic waves at a sending station, a signal channel interconnecting said recorder and said means for initiating seismic waves, means coupled to said element and operative at a predetermined rotational position of said element to interrupt said signal channel at said recorder for generating and applying to said signal channel an initiating signal, delay means in said signal channel located at said sending station for delaying said initiating signal for a predetermined interval, a circuit connected in an output side of said delay means for applying the delayed initiating signal to said signal channel, and means in said system for closing said signal channel at said recorder during said predetermined interval.

References Cited in the file of this patent
UNITED STATES PATENTS

| | | |
|---|---|---|
| 2,707,524 | Montgomery | May 3, 1955 |
| 2,709,796 | Rodman et al. | May 31, 1955 |
| 2,767,389 | McCollum | Oct. 16, 1956 |
| 2,795,287 | Sharpe | June 11, 1957 |